United States Patent [19]

Littlejohn et al.

[11] Patent Number: 5,123,495

[45] Date of Patent: Jun. 23, 1992

[54] WHEELCHAIR STAIR CLIMBING CONTROL SYSTEM

[75] Inventors: Douglas J. Littlejohn; John H. Hessler, both of Sunnyvale; Baxter R. Watkins, Foster City, all of Calif.

[73] Assignee: Quest Technologies, Inc., Sunnyvale, Calif.

[21] Appl. No.: 440,054

[22] Filed: Nov. 21, 1989

Related U.S. Application Data

[63] Continuation-in-part of Ser. No. 205,404, Jun. 10, 1988, Pat. No. 4,915,184.

[51] Int. Cl.$^5$ .................................................. A61G 5/06
[52] U.S. Cl. .............................. 180/9.32; 180/907; 280/5.22; 280/DIG. 10; 364/424.05
[58] Field of Search .................. 280/5.22, 5.2, 5.24, 280/708, DIG. 10; 180/9.32, 6.5, 901, 907, 8.2, 8.7; 364/424.05; 318/466

[56] References Cited

U.S. PATENT DOCUMENTS

| | | | |
|---|---|---|---|
| Re. 28,256 | 11/1974 | Zamotin | 280/5.22 |
| 2,765,860 | 10/1956 | Church | 180/907 |
| 3,068,950 | 12/1962 | Davidson | 180/907 |
| 3,077,345 | 2/1963 | Andersson et al. | 280/708 |
| 3,111,331 | 11/1963 | Locke | 280/5.22 |
| 3,127,188 | 3/1964 | Greub | 280/5.22 |
| 3,133,742 | 5/1964 | Richison et al. | 280/DIG. 10 |
| 3,142,351 | 7/1964 | Green | 180/8.2 |
| 3,146,841 | 9/1964 | Locke | 280/5.22 |
| 3,166,138 | 1/1965 | Dunn, Jr. | 280/11 |
| 3,178,193 | 4/1965 | Grogan | 280/5.26 |
| 3,191,953 | 6/1965 | Aysta | 280/5.22 |
| 3,195,910 | 7/1965 | Steiner | 280/5.22 |
| 3,196,970 | 7/1965 | Brenner | 180/8.2 |
| 3,198,534 | 8/1965 | Porter | 280/5.22 |
| 3,204,716 | 9/1965 | Phillips et al. | 180/9.22 |
| 3,231,036 | 1/1966 | Appendrodt | 180/6.5 |
| 3,231,290 | 1/1966 | Weyer | 280/5.22 |
| 3,259,200 | 7/1966 | Maijala | 180/9.23 |
| 3,259,396 | 7/1966 | Zamotin | 180/5.22 |
| 3,288,234 | 11/1966 | Feliz | 180/6.5 |
| 3,292,722 | 12/1966 | Bamberg | 180/9.23 |
| 3,295,858 | 1/1967 | Addison, Jr. | 280/5.3 |
| 3,304,094 | 2/1967 | Wenger | 280/5.2 |
| 3,346,062 | 10/1967 | Richison et al. | 180/6.7 |
| 3,406,772 | 10/1968 | Ahrent et al. | 180/9.23 |
| 3,529,688 | 9/1970 | Bruce | 180/9.23 |
| 3,869,011 | 3/1975 | Jensen | 280/5.22 |
| 4,033,421 | 7/1977 | Ikarimoto | 280/5.22 |
| 4,061,199 | 12/1977 | Last | 280/5.22 |
| 4,077,483 | 3/1978 | Randolph | 180/6.5 |
| 4,119,163 | 10/1978 | Ball | 180/6.5 |
| 4,119,164 | 10/1978 | Fogg, Jr. et al. | 180/6.5 |
| 4,136,888 | 1/1979 | Bowie, Jr. et al. | 280/5.22 |
| 4,154,315 | 5/1979 | Rasmussen | 280/DIG. 10 |
| 4,194,584 | 3/1980 | Kress et al. | 180/6.5 |
| 4,207,959 | 6/1980 | Youdin | 180/6.5 |
| 4,222,449 | 9/1980 | Feliz | 180/8.2 |
| 4,387,325 | 6/1983 | Klimo | 318/71 |
| 4,401,178 | 8/1983 | Studer | 280/5.22 |
| 4,411,330 | 10/1983 | Blokland | 280/5.22 |
| 4,421,336 | 12/1983 | Petrofsky et al. | 180/6.5 |
| 4,432,425 | 2/1984 | Nitzberg | 280/5.22 |
| 4,432,426 | 2/1984 | Misawa | 280/DIG. 10 |
| 4,473,234 | 9/1984 | Egen | 280/5.22 |

(List continued on next page.)

Primary Examiner—Charles A. Marmor
Assistant Examiner—Anne Marie Boehler
Attorney, Agent, or Firm—Townsend and Townsend

[57] ABSTRACT

The present invention provides a sensor for detecting the angle of an incline, such as a staircase, before it is reached by the wheelchair. A control signal is provided to a motor for tilting the seat to cause the seat to be tilted to a predetermined minimum safe angle before the wheelchair reaches the staircase. The minimum safe angle is an angle of tilt at which the wheelchair will not roll over if the tilting mechanism should fail to completely rotate the seat to a horizontal position and as the stairs are descended. The minimum safe angle is determined by the position of the center of gravity of the wheelchair which is affected by the users weight. If the seat does not achieve this minimum tilt, the wheelchair is prevented from going over the stairs.

15 Claims, 7 Drawing Sheets

U.S. PATENT DOCUMENTS

| | | | |
|---|---|---|---|
| 4,556,229 | 12/1985 | Bihler et al. | 280/5.22 |
| 4,556,997 | 12/1985 | Takamiya et al. | 623/3 |
| 4,564,080 | 1/1986 | Pagett | 180/8.2 |
| 4,566,550 | 1/1986 | Misawa | 180/8.2 |
| 4,566,706 | 1/1986 | Bihler et al. | 280/5.22 |
| 4,566,707 | 1/1986 | Nitzberg | 180/8.2 |
| 4,585,241 | 4/1986 | Misawa et al. | 280/5.22 |
| 4,627,508 | 12/1986 | Auer | 180/9.22 |
| 4,634,941 | 1/1987 | Klimo | 180/6.5 |
| 4,671,369 | 6/1987 | Tiffin et al. | 180/8.2 |
| 4,674,584 | 6/1987 | Watkins | 280/5.22 |
| 4,688,813 | 8/1987 | Misawa et al. | 280/5.22 |
| 4,747,457 | 5/1988 | Buscaiolo et al. | 280/5.22 |
| 4,771,839 | 9/1988 | Misawa | 280/5.22 |
| 4,854,408 | 8/1989 | Beard et al. | 180/9.32 |
| 4,898,256 | 2/1990 | Lehner | 280/5.22 |
| 4,915,184 | 4/1990 | Watkins | 180/907 |

WHEELCHAIR STAIR CLIMBING CONTROL SYSTEM

This is a continuation-in-part of application Ser. No. 205,404, filed Jun. 10, 1988, now U.S. Pat. No. 4,915,184.

BACKGROUND

The present invention relates to control systems for controlling the operation of a wheelchair while climbing or descending stairs.

A major challenge for wheelchair designers has been to design a wheelchair which can ascend and descend stairs, and yet not be unduly large, cumbersome or expensive. One design is shown in U.S. Pat. No. 4,674,584. The wheelchair travels on normal wheels during horizontal operation, and has ultrasonic sensors detecting the presence of a stairway or other incline. The sensor signals are used to activate and lower a pair of tracks, which are looped endless treads. In addition to lowering the tracks, a signal from the ultrasonic sensors is also used to determine if the incline is too steep for the wheelchair to negotiate. In such an instance, the wheelchair will not be allowed to move forward and up or down the stairs.

One problem with movement down a stairway is that as a wheelchair edges over the stairway, it will suddenly tilt downward and slam onto the stairway, jolting the user or potentially injuring the user. A solution to this problem is described in U.S. Pat. No. 4,671,369. Forward and rearward arms are deployed beneath the wheelchair and extend downward over the stairs as the wheelchair approaches. As the body of the wheelchair begins to tilt down the stairs, the arm is already resting across the steps. A shock absorbing, fluid-filled cylinder between this extended arm and the body of the wheelchair ensures that the body of the wheelchair will slowly ease into position pointing down the stairway. The shock absorber is simply a tube with a piston extending through it and fluid therein to slow the movement of the piston through the cylinder. The 369 patent shows a mechanical linkage mechanism for deploying these cushioning arms.

In order to provide maximum comfort for a user during the ascending or descending of stairs, the seat is tilted so that the user is held horizontal while the body of the wheelchair is inclined. This tilting movement is also necessary to move the center of gravity of the wheelchair and the user to an appropriate position to allow it to safely climb the stairs. If the center of gravity is too far forward, away from the stairs, the wheelchair might roll. Thus, there is a danger, that if the tilting mechanism fails to operate, the wheelchair could roll.

SUMMARY OF THE INVENTION

The present invention provides a sensor for detecting the angle of an incline, such as a staircase, before it is reached by the wheelchair. A control signal is provided to a motor for tilting the seat to cause the seat to be tilted to a predetermined minimum safe angle before the wheelchair reaches the staircase. The minimum safe angle is an angle of tilt at which the wheelchair will not roll over if the tilting mechanism should fail to completely rotate the seat to a horizontal position and as the stairs are descended. The minimum safe angle is determined by the position of the center of gravity of the wheelchair which is affected by the user's weight. If the seat does not achieve this minimum tilt, the wheelchair is prevented from going over the stairs.

Once the wheelchair starts descending the stairs, the seat is tilted a remaining amount necessary to achieve a horizontal (with respect to gravity) position for the bottom of the seat supporting the user. Thus, the user is not tilted so far as to be uncomfortable before reaching the stairs, while being tilted far enough to prevent rolling of the wheelchair in the event that the tilting mechanism should fail once the wheelchair is on the stairs.

The present invention also improves upon the operation of the cushioning arms, sometimes called "easy-downs". These cushioning arms extend over the stairway in contact with the steps prior to tilting of the main body of the wheelchair. An improved shock absorbing mechanism is provided. A cylinder is coupled to the wheelchair body, with a piston in the cylinder being coupled to the cushioning arm. The top portion of the cylinder is filled with fluid. A hose is coupled to the top of the cylinder to a reservoir through a one-way valve which restricts the flow from the cylinder to the reservoir. Thus, as the weight of the wheelchair is applied to the cylinder and piston arrangement, the fluid will slow the descent of the body of the wheelchair onto the stairs.

The cushioning arm should be raised quickly after the wheelchair is in contact with the steps to allow the wheelchair to move down the stairs. This is done with an air compressor coupled through a hose to the bottom portion of the tube to force the piston back up the cylinder. A bypass valve is provided around the restricted flow valve, and is opened in response to a control signal indicating that the wheelchair is in position.

The present invention thus provides a fail-safe mechanism to prevent rollover during the ascending or descending of stairs or a similar incline. The pretilting of the seat also makes the roll over onto the stairs softer and smoother by moving the weight back.

The present invention also provides an improved easy-down mechanism which simplifies and speeds up the operation of the wheelchair during stair climbing or descending.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
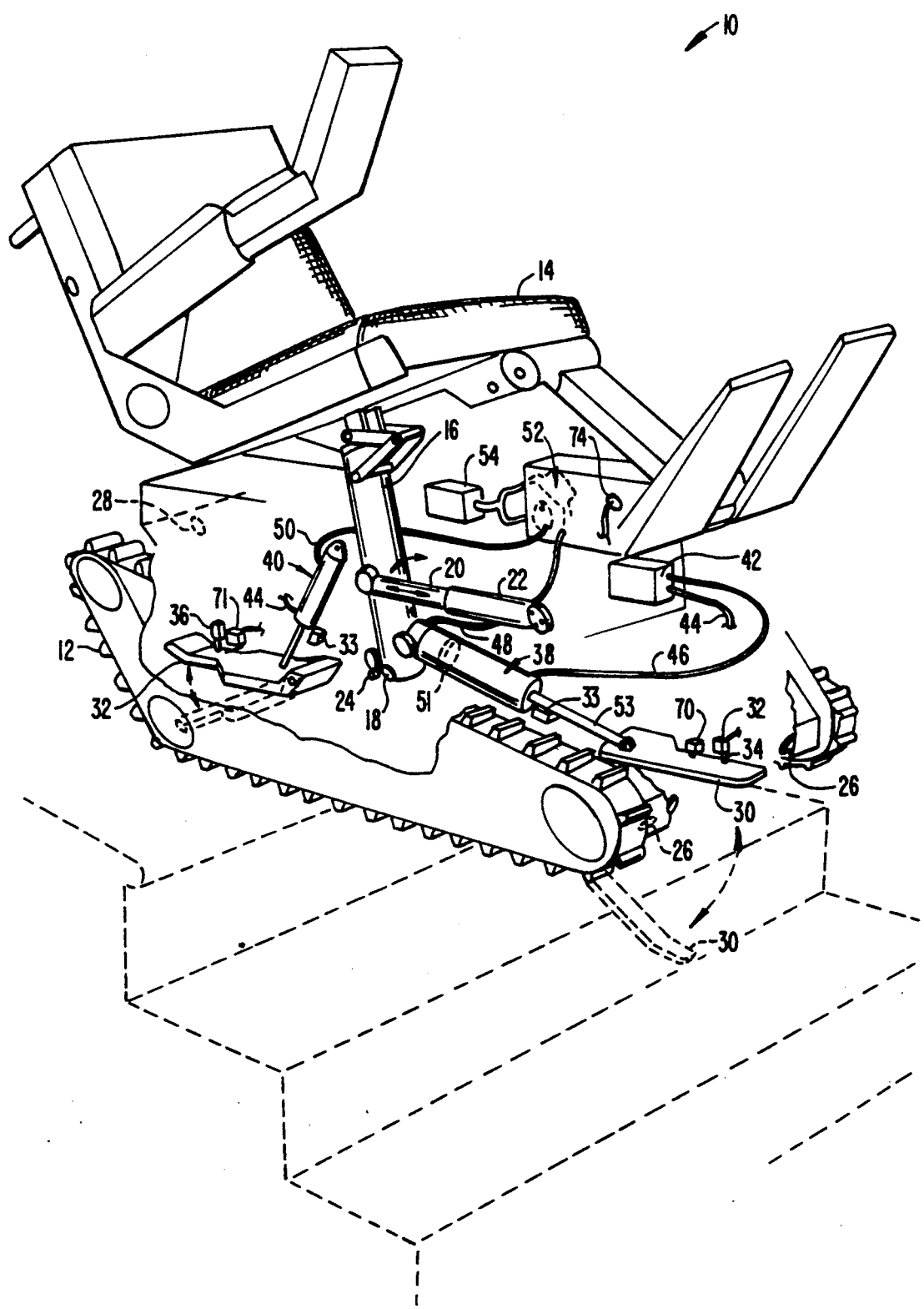
FIG. 1 is a perspective view of a wheelchair according to the present invention.

FIG. 1 shows a wheelchair 10 according to the present invention. A pair of tracks 12 are used to move the wheelchair while ascending or descending an incline, such as a staircase. When not needed, the pair of tracks 12 can be raised so that the wheelchair can operate in the normal mode using its wheels. A seat 14 is supported by a post 16. Post 16 can be pivoted about a pivot point 18 with an arm 20. Arm 20 is coupled to a motor actuator 22 which moves arm 20 forward or backward to tilt seat 14.

A rotational resistive sensor 24 coupled to the bottom of post 16 is used to detect the actual tilt of the seat. A pair of forward ultrasonic sensors 26 and a rearward ultrasonic sensor 28 detect the angle of the inclination of the surface the wheelchair is travelling over. The rear ultrasonic detector 28 is used when the wheelchair is ascending stairs, which is done in reverse.

FIG. 1 also shows an inclinometer 74 for detecting the degree of inclination of the wheelchair frame. A signal from inclinometer 74 is used to control motor actuator 22 to maintain the bottom of seat 14 in a horizontal (with respect to gravity) position during normal operation.

Front and back cushioning arms 30 and 32 are provided to cushion the movement of the wheelchair while it is easing downward onto a staircase for descending (arm 30) or ascending onto a landing from a staircase (arm 32).

When the wheelchair is in position for descending a staircase, a solenoid 31 retracts a latch 34 same as arms 32 which holds cushioning arm 30 in an up position. The force of gravity allows cushioning arm 30 to drop, so that it extends over and is in contact with the steps of a staircase. A similar solenoid and latch 36 is used for rear cushioning arm 32. Sensor 71 detects when arm 32 is in the up position. Optional sensors 33 detect when the arms are in a down position. Piston and cylinder assemblies 38 and 40 couple cushioning arms 30 and 32, respectively, to the wheelchair frame. Compressor 42 provides air through air hoses 46 and 44 to the bottom ends of cylinders 38 and 40, respectively. The top ends of cylinders 38 and 40 are coupled through hoses 48 and 50, via a set of valves 59 to a reservoir of fluid 54. This arrangement is diagramed in more detail in FIG. 2.

Figure 2:
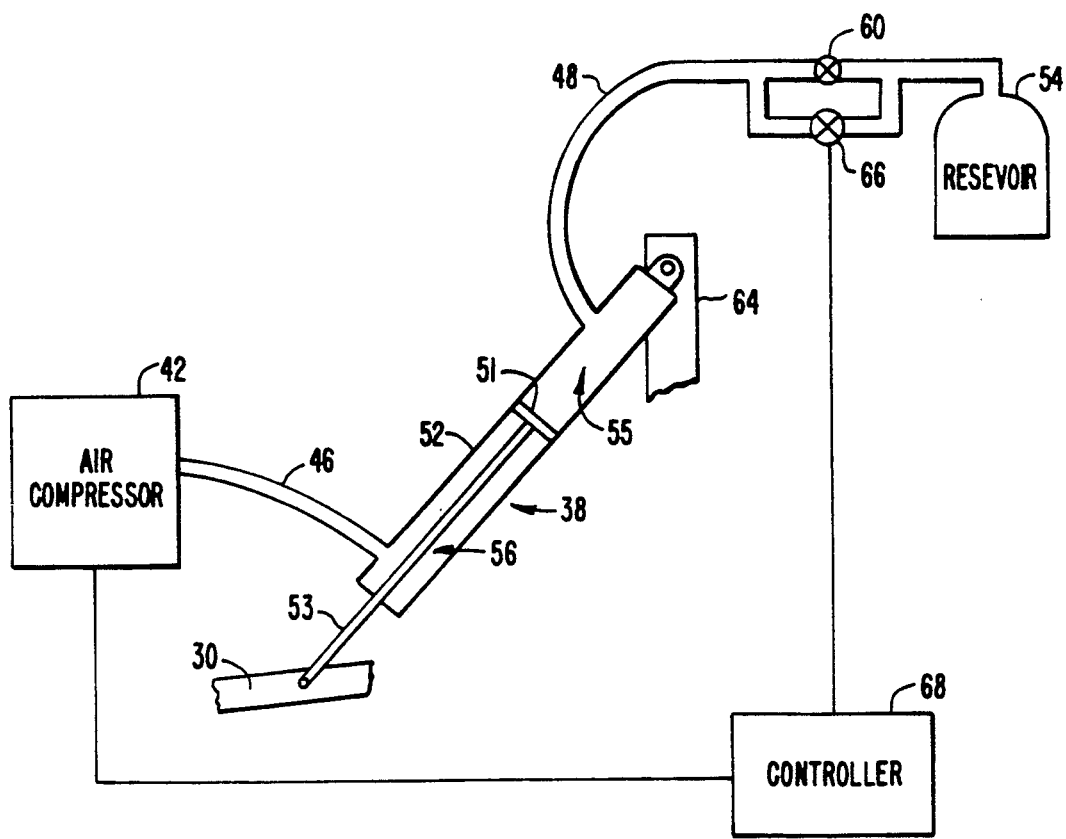
FIG. 2 is a diagram of the piston and cylinder arrangement for the easy-down of FIG. 1.

FIG. 2 is a diagram of front air cylinder assembly 38 coupled to front cushioning arm 30. A piston 51 is connected to a shaft 53 extending out of a hollow cylinder 52 which has a fluid in a top portion 55, and air in a bottom portion 56. A hose 48 couples top portion 55 through a restricted flow valve 60 to a reservoir 54. Valve 60 restricts the flow from cylinder 52 to reservoir 62, while allowing unrestricted flow in the opposite direction. Valve 60 is adjustable to allow for different user weights. Thus, as wheelchair frame 64, coupled to a top end cf cylinder 52, tilts down a staircase, the restricted flow of valve 60 slows the compression by piston 51, thereby cushioning the tilting movement. When the cushioning arm 30 is to be retracted, a bypass valve 66 is opened by a controller 68 to allow the fluid to be pushed rapidly into reservoir 54. The piston is raised by an air compressor 42 which forces air through a hose 46 into the bottom portion 56 of cylinder 52. This forces the piston to rise, pushing the fluid into reservoir 54 and raising arm 30. When arm 30 is fully raised, a sensor 70 (see FIG. 1) detects that it is in the up position and latched via latch 34.

The preferred fluid for use in cylinder 52 is a mix of water and ethylene glycol (antifreeze). This was chosen because they are relatively clean fluids which also provide the necessary incompressibility and are inexpensive and readily available.

Figure 3:
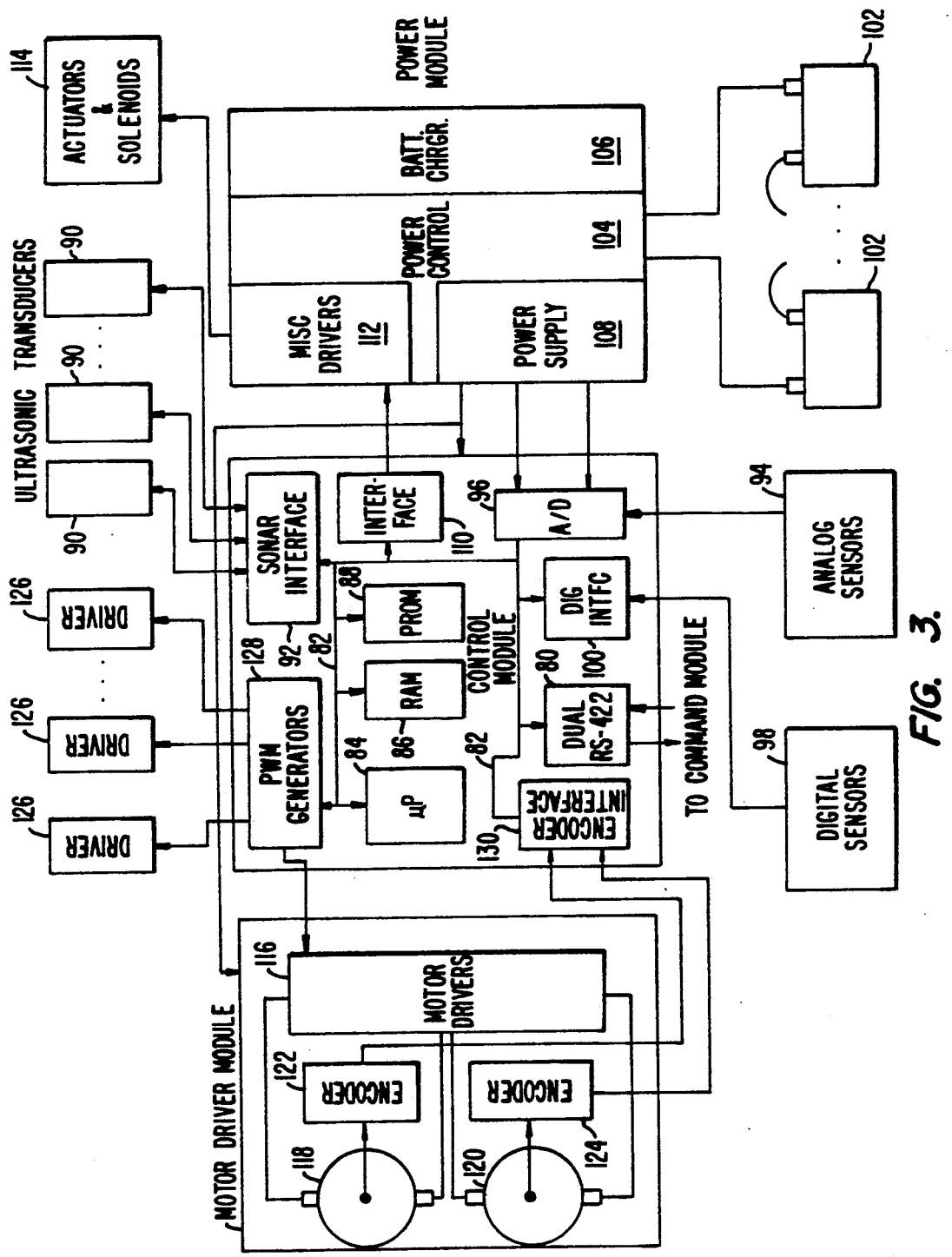
FIG. 3 is a block diagram of the control system for the wheelchair of FIG. 1.

FIG. 3 is a block diagram of the electronics of the wheelchair of FIG. 1. A serial interface 80 provides a link to a command module (not shown) which processes user inputs and controls the display. The user inputs can be in the form of push-buttons on a keypad or movements of a joystick. Interface 80 is coupled to an internal bus 82, which in turn is coupled to a microprocessor 84, a RAM 86 and a PROM 88. Ultrasonic transducers 90 are provided through a sonar interface 92 to bus 82. Analog sensors 94 include the inclinometer 74 and seat tilt sensor 24 of FIG. 1. These analog signals are provided through an analog-to-digital (A/D) converter 96 to bus 82. Digital sensors 98 include sensors 70 and 71 for detecting the easy downs being in the up position. A seat back tilt sensor is also provided. Digital sensors 98 are provided to a digital interface 100 to system bus 82.

The system is powered by batteries 102 which are coupled to a power control circuit 104. A battery charger circuit 106 is coupled to power control circuit 104, and a power supply circuit 108 provides power to a control module containing microprocessor 84 and the other electronics.

An interface 110 couples bus 82 through drivers 112 to actuators and solenoids 114. Included in the actuators and solenoids are the solenoid latches for releasing for the easy downs 30 and 32. Other actuators include the actuator for the air compressor 42 and an actuator for the bypass valve 66.

Motor drivers 116 are coupled to motors 118 and 120 for driving the wheels. Encoders 122 and 124 provide the feedback on the speed of travel. The feedback from encoders 122, 124 is provided through encoder interface 130 to system bus 82. The same motors will also drive the tracks, when activated by a track lowering mechanism coupled to one of drivers 126. Drivers 126 also control the position of the seat and the tilt of the seat. These drivers are controlled through a pulse width modulator generator 128 coupled to system bus 82.

Figure 4A:
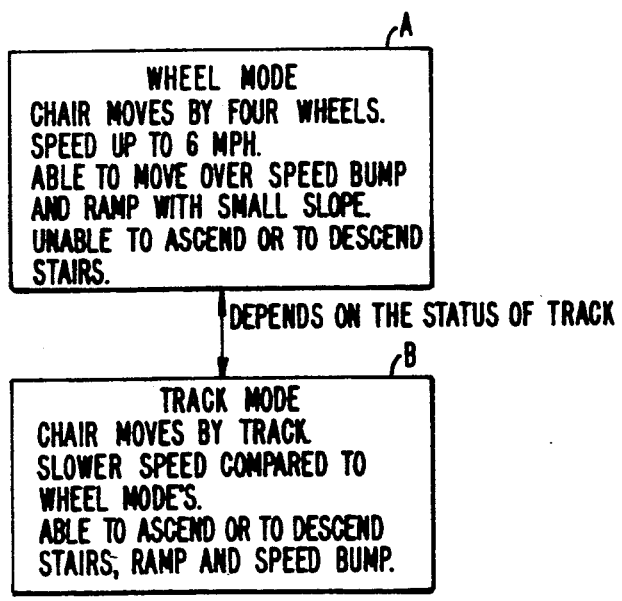
FIGS. 4A-4F are flow charts of the operation of the wheelchair of FIG. 1 during stair ascending or descending.

The operation of the stair-climbing wheelchair of the present invention will now be described with respect to flow charts 4A-4F. FIG. 4A is a mode diagram showing the transition between a wheel mode A and a track mode B. In the wheel mode, the wheelchair moves with four wheels and does not have the capability to ascend or descend stairs. In the track mode, the tracks are lowered upon detection of an incline of sufficient steepness by the ultrasonic transducers. A single ultrasonic transducer for each direction could be used, with the microprocessor calculating the difference in distance to determine the variation in vertical height. Multiple ultrasonic transducers are used for increased reliability and reduced errors.

Figure 4B:
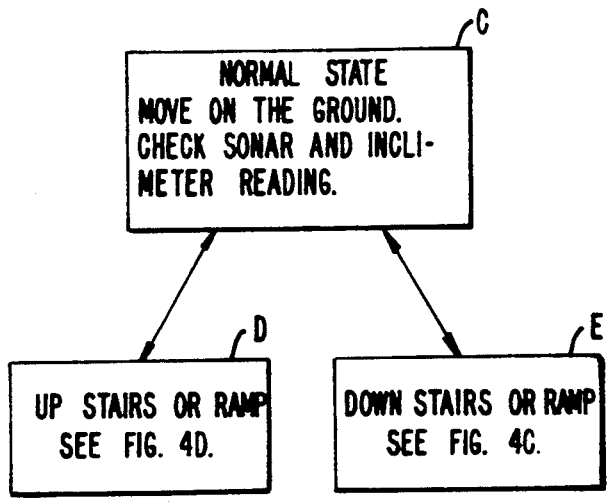

FIG. 4B is a track mode state diagram. In a normal state C, the wheelchair moves along horizontal ground, constantly checking the sonar (ultrasonic transducers) for vertical drops and also checking the inclinometer. The seat tilt is adjusted in accordance with the inclinometer reading to maintain the user in a horizontal position. Minor variations are filtered out so that the user is not constantly jostled around.

Figure 4E:
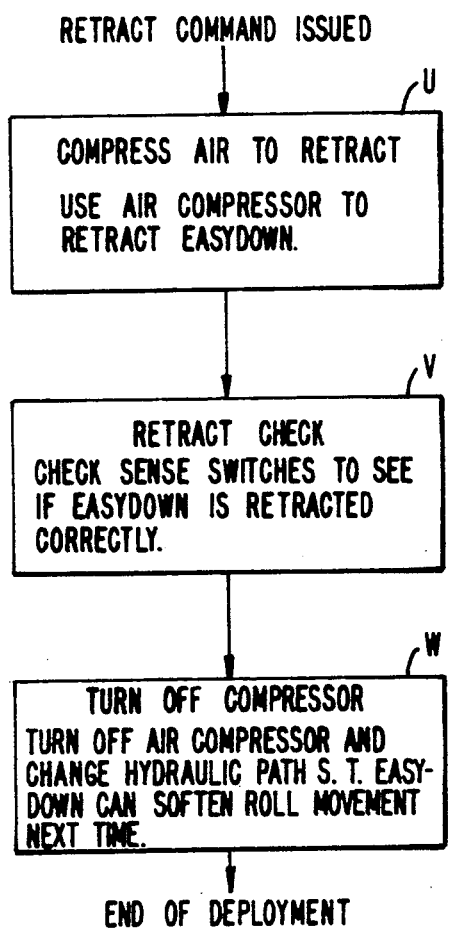
Figure 4C:
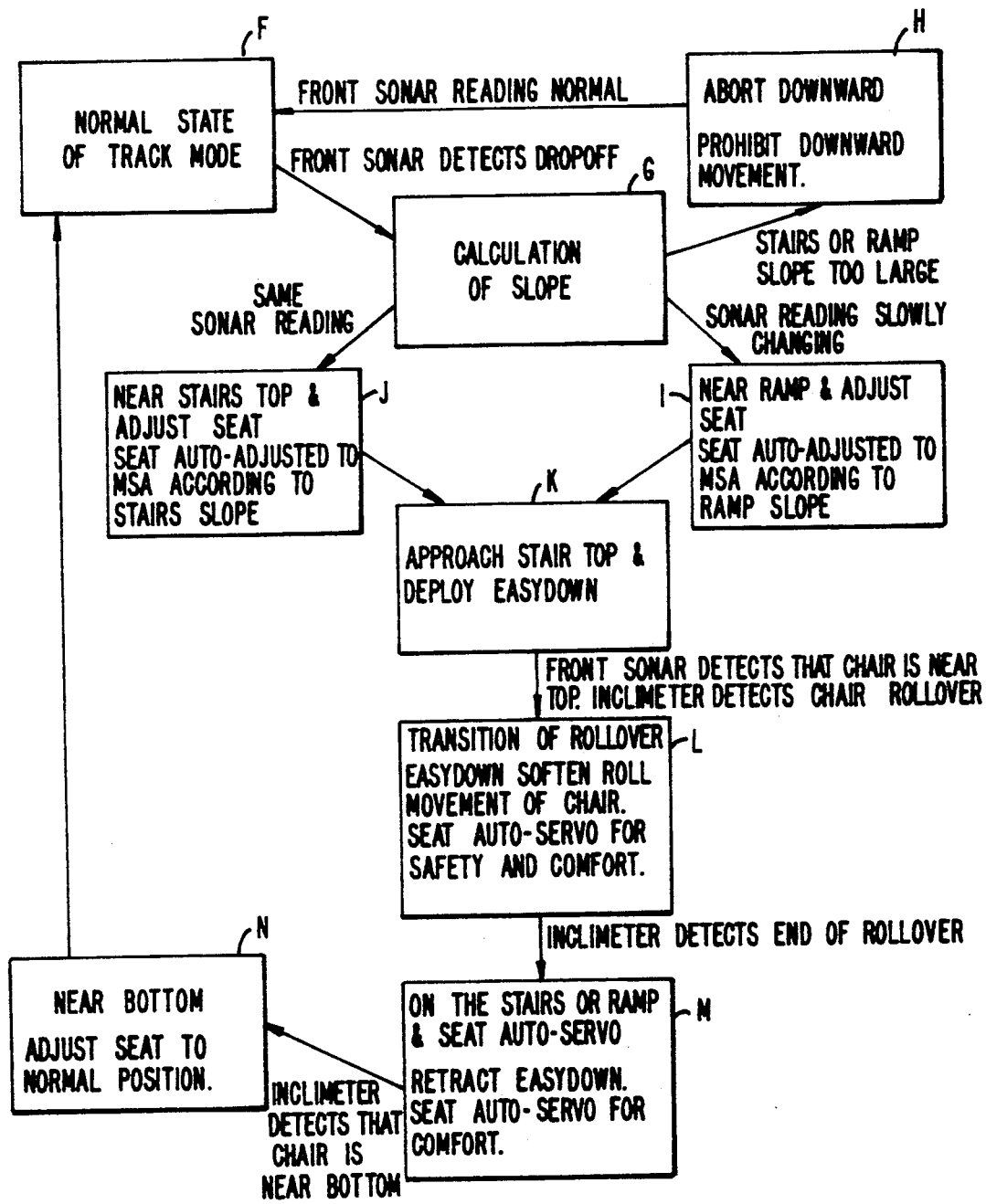
Figure 4D:
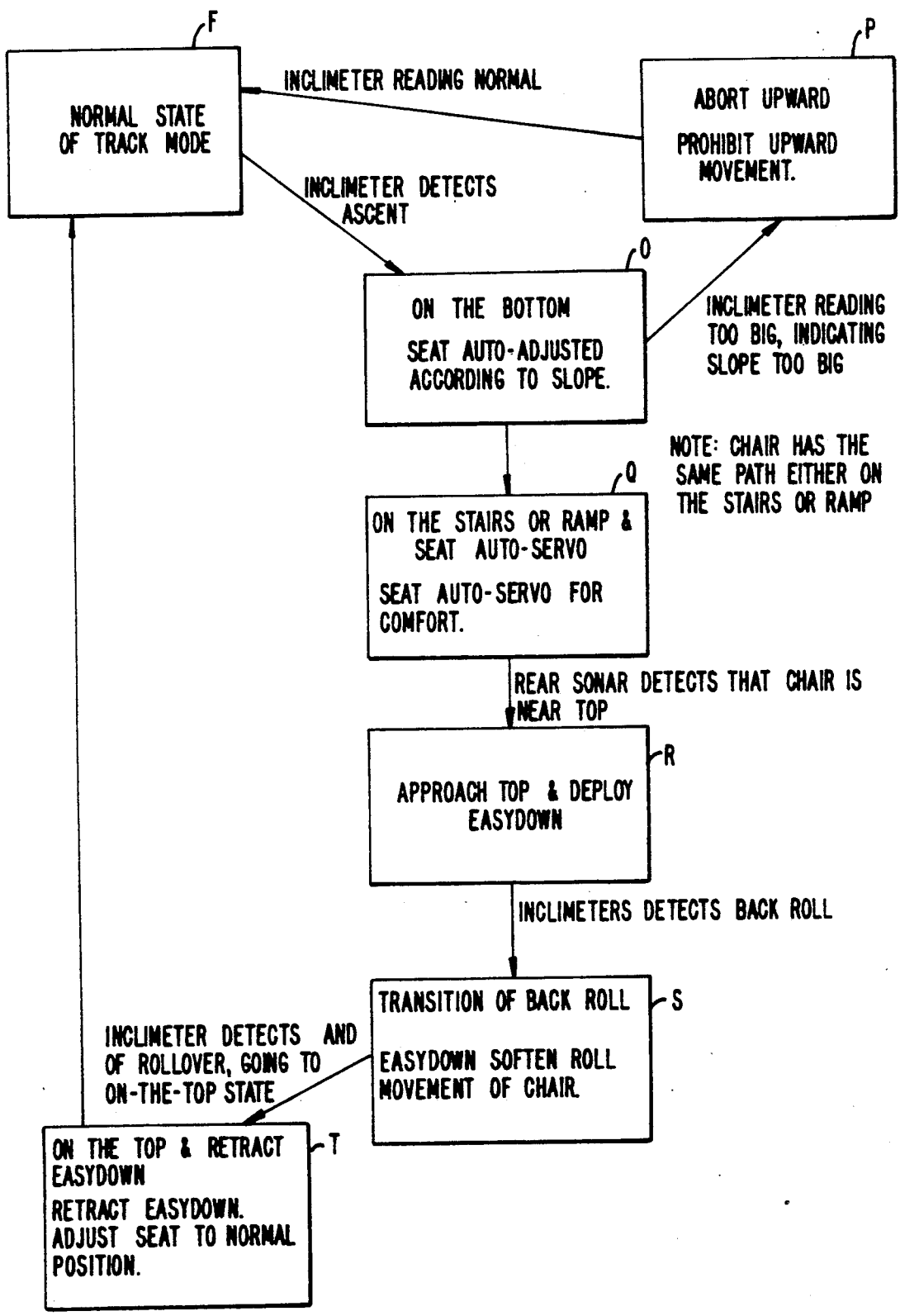

Upon detection of an upward vertical slope of sufficient incline, the wheelchair moves into the stairs or ramp mode D, shown in FIG. 4D. Upon detection of a vertical decline for a staircase or ramp, the wheelchair moves into state E in its program, shown in more detail in FIG. 4C.

For a downstairs ramp as shown in FIG. 4C, the first step, F, is to insure that the wheelchair is in the track mode. Next, the slope of the stairs or ramps is calculated (step G). For a staircase, the slope is measured by moving the wheelchair forward and detecting the distance between two drop-offs. The slope can then be calculated by triangulation, knowing the distance between the steps and the depth of a step. Encoders 122, 124 will provide the distance travelled and an ultrasonic sensor(s) 26 will provide the change in depth. A ramp's angle can be calculated by looking at the rate of change over the change in distance traveled. If the ramp or steps are too steep, further forward movement is prohibited (step H).

If a ramp which is not too steep is detected, the wheelchair seat is adjusted to a minimum safe angle at the top of the ramp (step I) or the top of the staircase (step J).

The minimum safe angle (MSA) of the seat can be determined in advance for the maximum angle of incline the wheelchair will be allowed to negotiate. This is done using the known center of gravity of the wheelchair, as modified by the weight of a user or the extreme value of a range of weights for a range of users. The calculated angle at which the user and seat should be tilted to avoid roll over can then be used for lesser angles as well. Alternately, a separate MSA can be calculated for each incline angle. This calculation can be done each time, or the values could be stored in a table. The seat could also contain a weight sensor, which could modify the table to give further accuracy for each user of a group of users.

Once the wheelchair has adjusted its seat to the MSA, it deploys the front easy down, or cushioning arm 30 at the stair top (step K). The front easy down is deployed by retracting holding latch 34 as shown in Fig. 1. The microprocessor checks sensor 70 to verify that the easy down is no longer in its up position. A separate sensor 33 may be included to verify that the easy down is in its down position. Otherwise, gravity may be relied upon.

After the easy down is deployed, the chair is moved forward and starts to roll over (step L). During roll over, the angle is detected by the inclinometer and the seat is adjusted accordingly to keep the user horizontal with respect to gravity. During roll over, forward movement of the wheelchair is prohibited until it assumes its new angle. After the chair has settled at the angle of the staircase, the easy down is retracted (step M). This is done by forcing air into the lower end of the piston and cylinder apparatus, and opening the bypass valve as shown in FIG. 2. Another bypass valve on the air compressor is also activated to prevent air release while the compressor is running. At other times, the air release valve in the air compressor allows the stored air pressure to vent.

Once the up sensor 70 detects the easy down in the up position, the wheelchair is allowed to proceed. When the wheelchair reaches the bottom of the staircase, the inclinometer will detect a change in angle, indicating that it is near the bottom. The seat will be adjusted to its normal position in accordance with the inclinometer reading (step N). When the chair is in the normal position, the wheelchair will be in its normal track mode (step F).

FIG. 4D shows the up stairs or up ramp mode of the program. The front ultrasonic transducer or inclinometer will detect an incline, and will prevent forward movement of the wheelchair up the incline. The user must turn the wheelchair around and approach the incline in reverse. As the wheelchair begins its ascent up the incline or stairs, the inclinometer detects the angle of ascent and the seat is adjusted accordingly (step O). If the angle becomes too great, indicating too great of a slope, further upward movement is prohibited (step P). Otherwise, the wheelchair continues up the ramp and the seat is further moved to keep it in a horizontal position with respect to gravity (step Q). When the rear ultrasonic transducer detects a landing at the top of the stairs or ramp, the rear easy down or cushioning arm 32 is deployed in a manner similar to the front easy down (step R). The inclinometer detects the backward roll of the wheelchair onto the landing as it is moved forward and the easy down will soften this movement (step S). There is no need to stop the rearward movement of the wheelchair at this time, with the inclinometer simply detecting the roll over, adjusting the seat accordingly and moving forward until the wheelchair assumes a horizontal position. There is no danger of roll over at this point, and therefore an early movement of the seat to an MSA is not necessary. At this point, the easy down is retracted (step T) in the same manner as the front easy down. The seat is constantly adjusted during the roll over to keep the user horizontal and the wheelchair then enters the normal track mode F.

FIG. 4E shows the easy down retract state diagram in more detail. Once the retract command is received, the air compressor and the bypass valve are activated (step U). Next, up sensor 70 is checked to make sure the easy down has been properly retracted (step V). The air compressor is then turned off (step W) so that the easy down is ready for the next deployment.

Figure 4F:
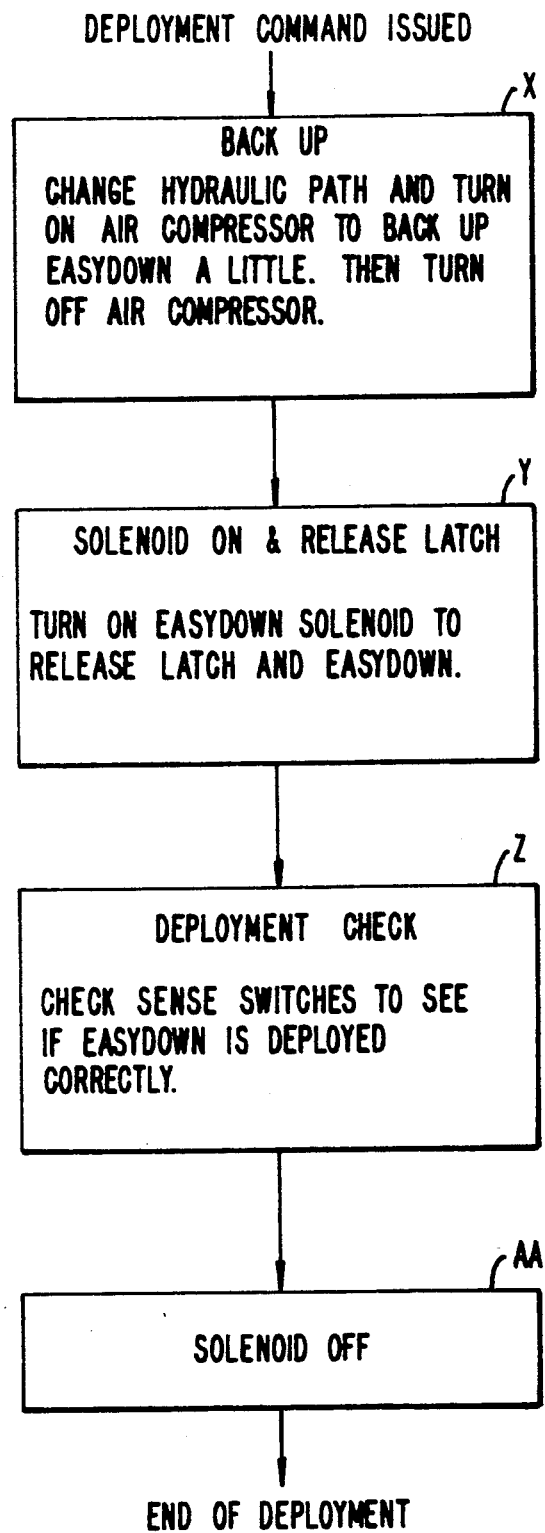

FIG. 4F shows the easy down deployment state diagram. When the deployment command is issued, the air compressor is turned on to push the easy down up a little to provide a little play for latch 34 (step X). The air compressor is then turned off and solenoid 32 activates latch 34, which will release the easy down (step Y). Sensor 70 is then checked to determine that the easy down is no longer in the up position (step Z). The solenoid 32 for retracting the latch is then turned off (step AA).

As will be understood by those familiar with the art, the present invention may be embodied in other specific forms without departing from the spirit or essential characteristics thereof. For example, a single forward easy down could be used, with the wheelchair moving both up and down stairs in the forward position, and the seat being made to tilt in both directions to accommodate this. Accordingly, the disclosure of the preferred embodiment of the invention is intended to be illustrative, but not limiting, of the scope of the invention which is set forth in the following claims.

What is claimed is:

1. In a stair-climbing, personal transport vehicle having a seat, the improvement comprising:
   a sensor for detecting the angle of incline of a surface before said vehicle traverses said surface;
   means for adjusting a tilt of said seat;
   means for sensing the tile of said seat; and
   means, responsive to said sensor and said tilt sensing agent for preventing movement of said vehicle over said incline, if said incline exceeds a predetermined steepness, until said means for adjusting has tilted said seat to a predetermined minimum angle, including a means for calculating said minimum angle, based on said detected angle, the weight of a user and the center of gravity of said vehicle, to give a change in the center of gravity of said vehicle and a user sufficient to prevent said vehicle from rolling over on said incline.

2. The apparatus of claim 1 further comprising:
   means for detecting an angle of inclination of said vehicle; and said means for adjusting a tilt of said seat being responsive to said angle of inclination to keep the bottom of said seat horizontal with respect to gravity.

3. The apparatus of claim 2 wherein said means for adjusting a tilt of said seat comprises:
a shaft coupled to a support of said seat; and
a seat tilt motor for driving said shaft.

4. The apparatus of claim 1 further comprising a position sensor for detecting a tilt of said seat.

5. The apparatus of claim 1 wherein said sensor for detecting an angle comprises a first sensor for detecting a distance traveled by said vehicle and a second sensor for detecting a distance from said sensor to a point in front of said vehicle to provide a depth measurement, said angle of incline being calculated by the combination of a change in said depth measurement and a change in distance of said vehicle.

6. A personal transport vehicle comprising:
a track means for moving said vehicle over an inclined surface;
a member coupled to said vehicle proximate an end of said vehicle, for cushioning a tilting movement of said vehicle;
a tube coupled to one of said vehicle and said member;
a piston extending into said tube and coupled to a one of said vehicle and said member not coupled to said tube;
means for restricting the flow of a first fluid out of a first side of said tube to limit the speed at which the combination of said tube and said piston compresses;
means for forcing a second fluid into a second side of said tube to force a compression of said piston and tube combination; and
means for providing an increased flow of said first fluid out of said first side of said tube coincident with operation of said means for forcing to allow a quick compression of said tube and piston combination.

7. The apparatus of claim 6 further comprising a solenoid activated latch for holding said member in an up position.

8. The apparatus of claim 6 further comprising a fluid reservoir coupled to said first side of said tube and a valve for restricting a flow between said first side of said tube and said reservoir.

9. The apparatus of claim 8 wherein said means for providing an increased flow comprises a bypass valve for bypassing said restricted flow valve.

10. The apparatus of claim 6 wherein said second fluid comprises air.

11. The apparatus of claim 6 wherein said first fluid comprises a mixture of water and ethylene glycol.

12. The apparatus of claim 6 further comprising a sensor for detecting an up position of said member.

13. The apparatus of claim 6 further comprising a sensor for detecting a down position of said member.

14. A personal transport vehicle comprising:
track means for moving said vehicle over an inclined surface;
a member coupled to said vehicle proximate an end of said vehicle, for cushioning a tilting movement of said vehicle;
a tube coupled to one of said vehicle and said member;
a piston extending into said tube and coupled to a one of said vehicle and said member not coupled to said tube;
means for restricting the flow of a first fluid out of a first side of said tube to limit the speed at which the combination of said tube and said piston compresses, including a fluid reservoir coupled to said first side of said tube and a valve for restricting a flow between said first side of said tube and said reservoir;
means for forcing air into a second side of said tube to force a compression of said piston and tube combination;
a bypass valve for bypassing said restricted flow valve to provide an increased flow of said first fluid out of said first side of said tube coincident with operation of said means for forcing to allow a quick compression of said tube and piston combination; and
a sensor for detecting an up position of said member.

15. A personal transport vehicle comprising:
track means for moving said vehicle over an inclined surface;
a member coupled to said vehicle proximate an end of said vehicle, for cushioning a tilting movement of said vehicle;
a tube coupled to one of said vehicle and said member;
a piston extending into said tube and coupled to a one of said vehicle and said member not coupled to said tube;
means for restricting the flow of a first fluid out of a first side of said tube to limit the speed at which the combination of said tube and said piston compresses;
means for forcing a second fluid into a second side of said tube to force a compression of said piston and tube combination;
means for providing an increased flow of said first fluid out of said first side of said tube coincident with operation of said means for forcing to allow a quick compression of said tube and piston combination;
a sensor for detecting the angle of incline of a surface being traversed by said vehicle;
means for adjusting a tilt of said seat in accordance with said incline; and
means responsive to said sensor, for preventing movement of said vehicle over an incline of predetermined steepness until said means for adjusting has tilted said seat to a predetermined minimum angle.

* * * * *